(12) United States Patent
Ying et al.

(10) Patent No.: US 9,743,364 B2
(45) Date of Patent: Aug. 22, 2017

(54) ADAPTIVE TRANSMIT POWER ADJUSTMENT FOR PHONE IN HAND DETECTION USING WEARABLE DEVICE

(71) Applicant: Sony Corporation, Tokyo (JP)

(72) Inventors: Zhinong Ying, Lund (SE); Kåre Agardh, Rydebäck (SE); Aleksandar Rodzevski, Malmö (SE); Henrik Bengtsson, Lund (SE); Per Åstrand, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 51 days.

(21) Appl. No.: 14/425,520

(22) PCT Filed: Apr. 24, 2014

(86) PCT No.: PCT/IB2014/060986
§ 371 (c)(1),
(2) Date: Mar. 3, 2015

(87) PCT Pub. No.: WO2015/162457
PCT Pub. Date: Oct. 29, 2015

(65) Prior Publication Data
US 2016/0262116 A1    Sep. 8, 2016

(51) Int. Cl.
*G08C 17/00* (2006.01)
*H04W 52/28* (2009.01)
(Continued)

(52) U.S. Cl.
CPC .......... *H04W 52/288* (2013.01); *H04B 1/385* (2013.01); *H04B 13/005* (2013.01); *H04W 52/283* (2013.01)

(58) Field of Classification Search
CPC .............. H04W 52/288; H04W 52/283; H04B 13/005; H04B 1/385
See application file for complete search history.

(56) References Cited

U.S. PATENT DOCUMENTS

| 6,580,356 | B1 | 6/2003 | Alt et al. |
| 7,202,773 | B1 * | 4/2007 | Oba ................... G07C 9/00007 340/5.8 |

(Continued)

FOREIGN PATENT DOCUMENTS

| EP | 1596538 A1 | 11/2005 |
| EP | 2018038 A2 | 1/2009 |

(Continued)

OTHER PUBLICATIONS

Kwak, K. et al., "An Overview of IEEE 802.15.6 Standard", Invited Paper, Feb. 20, 2011, pp. 1-6. Retrieved on Aug. 21, 2014, retrieved from Internet: arxiv.org/pdf/1102.4106.

(Continued)

*Primary Examiner* — Abdelnabi O Musa
(74) *Attorney, Agent, or Firm* — Coats & Bennett, PLLC

(57) ABSTRACT

A system including a wireless communication device and a peripheral device communicate with each other using radio frequency (RF) waves that are propagated using a user's own body as a transmission medium. The wireless communication device selectively controls the transmit output power of the peripheral device to cause the peripheral device to transmit data and information in a low-power transmission mode. This minimizes the amount of RF waves that are received at the wireless communication device as reflected RF waves, but helps to ensure that the RF waves that do reach the wireless communication device are transmitted as surface waves along the user's skin. Responsive to the receipt of the surface waves, and based on a validity of the (Continued)

information carried by those surface waves, the wireless communication device transitions from a locked state to an unlocked state.

20 Claims, 4 Drawing Sheets

(51) Int. Cl.
*H04B 1/3827* (2015.01)
*H04B 13/00* (2006.01)

(56) References Cited

U.S. PATENT DOCUMENTS

| | | |
|---|---|---|
| 7,777,719 B2 | 8/2010 | Zhao |
| 7,822,983 B2 | 10/2010 | Aull et al. |
| 8,253,693 B2 | 8/2012 | Buil et al. |
| 8,600,373 B2 | 12/2013 | Moallemi et al. |
| 8,867,064 B2 | 10/2014 | Higashi et al. |
| 8,867,995 B2 | 10/2014 | Kim et al. |
| 8,912,879 B2 | 12/2014 | Fyke et al. |
| 9,000,914 B2 | 4/2015 | Baker et al. |
| 9,306,628 B2 | 4/2016 | Konanur et al. |
| 9,332,377 B2 | 5/2016 | Agardh et al. |
| 9,351,100 B2 | 5/2016 | Tarnhed et al. |
| 9,489,511 B2 | 11/2016 | Rodzevski et al. |
| 9,591,682 B2 | 3/2017 | Astrand et al. |
| 2005/0008148 A1 | 1/2005 | Jacobson |
| 2005/0015604 A1* | 1/2005 | Sundararajan .......... G06F 21/36 713/184 |
| 2005/0243061 A1 | 11/2005 | Liberty et al. |
| 2007/0145119 A1 | 6/2007 | Rhelimi |
| 2007/0254728 A1 | 11/2007 | Moallemi et al. |
| 2007/0281721 A1 | 12/2007 | Lee et al. |
| 2007/0282783 A1 | 12/2007 | Singh |
| 2008/0259043 A1* | 10/2008 | Buil ................ H04B 13/005 345/173 |
| 2009/0034591 A1 | 2/2009 | Julian et al. |
| 2009/0094681 A1 | 4/2009 | Sadler et al. |
| 2010/0277435 A1* | 11/2010 | Han ...................... G06F 3/0416 345/174 |
| 2011/0205156 A1 | 8/2011 | Gomez et al. |
| 2011/0221590 A1 | 9/2011 | Baker et al. |
| 2012/0026129 A1 | 2/2012 | Kawakami |
| 2012/0133605 A1 | 5/2012 | Tanaka |
| 2012/0242501 A1 | 9/2012 | Tran et al. |
| 2012/0249409 A1 | 10/2012 | Toney et al. |
| 2012/0324368 A1 | 12/2012 | Putz et al. |
| 2013/0017789 A1 | 1/2013 | Chi et al. |
| 2013/0147605 A1* | 6/2013 | Chang .................... H04Q 9/00 340/10.1 |
| 2013/0174049 A1 | 7/2013 | Townsend et al. |
| 2014/0003636 A1* | 1/2014 | Bodvarsson ......... H04R 25/552 381/311 |
| 2014/0085050 A1 | 3/2014 | Luna |
| 2014/0136414 A1 | 5/2014 | Abhyanker |
| 2014/0247148 A1 | 9/2014 | Proud |
| 2014/0325614 A1 | 10/2014 | Rhelimi |
| 2015/0068069 A1 | 3/2015 | Tran et al. |
| 2015/0162994 A1 | 6/2015 | Rodzevski et al. |
| 2015/0163221 A1 | 6/2015 | Bolin et al. |
| 2015/0285659 A1* | 10/2015 | Curtis ................... G01C 25/005 702/97 |
| 2016/0174025 A1* | 6/2016 | Chaudhri ............... H04W 4/02 455/41.1 |

FOREIGN PATENT DOCUMENTS

| | | |
|---|---|---|
| EP | 2378748 A1 | 10/2011 |
| EP | 2600319 A1 | 6/2013 |
| JP | 2008073462 A | 4/2008 |
| JP | 2009049951 A | 3/2009 |
| WO | 2011021531 A1 | 2/2011 |

OTHER PUBLICATIONS

BIONYM, "The Nymi", White Paper, Nov. 19, 2013, pp. 1-28.
International Search Report for PCT/IB2014/060986 mailed Sep. 18, 2014.

* cited by examiner

ADAPTIVE TRANSMIT POWER ADJUSTMENT FOR PHONE IN HAND DETECTION USING WEARABLE DEVICE

TECHNICAL FIELD

The present disclosure relates generally to transmit power control of remote devices, and more particularly to wireless communication devices that control the transmit power of a peripheral device to effect communications between the two devices

BACKGROUND

There is currently an emerging consumer market for certain types of wearable peripheral devices that are used as companion products to smartphone devices. Their popularity can be traced, in part, to the variety of features they offer. Such devices include, for example, rings, necklaces, glasses, and "wristlets" (e.g., a watch or wristband) that is worn around a user's wrist.

One feature provided by these wearable devices allows the wearable devices to be used as a personal token to automatically gain access to a smartphone that is in a locked state. Particularly, a wearable device worn by the user may communicate a code or token to the user's smartphone, thereby permitting the user to bypass the manual entry of a predetermined unlock sequence associated with the smartphone. However, this feature works best when the wireless communications device and the wearable device are physically very close to each other. One way to measure a distance between the two devices is to measure the signal strength of the wearable device when it transmits at a standard power.

Such methods, however, are problematic. For example, it is difficult to determine based on the measurements whether a peripheral device is very close to a wireless communications device with a clear line of sight, or whether there are objects disposed between the devices that block or deflect transmissions from the wearable device. Further, signals transmitted by the wearable device may be reflected or deflected by different objects even when there is a clear line of sight between the two devices. Thus, such measurements may not be able to accurately determine whether the wearable device is sufficiently close to the wireless communications device.

SUMMARY

Embodiments of the present disclosure provide methods and corresponding devices for confirming whether a peripheral device worn by a user is sufficiently close to (i.e., within a predetermined distance of) the user's wireless communication device. More specifically, embodiments of the present disclosure call for the wireless communication device to selectively lower the transmit output power of the peripheral device when communicating with the wireless communication device. Lowering the transmit power of the peripheral device minimizes the amount of the reflected radio frequency (RF) waves that will reach the wireless communication device, and instead, helps to ensure that the RF waves reaching the wireless communication device comprise surface RF waves that propagate across the user's skin. So received, the wireless communication device can be better assured that the information carried by these surface waves was indeed transmitted by the peripheral device.

Accordingly, in one embodiment, the present disclosure provides a method for confirming that a peripheral device is positioned within a predetermined distance of a wireless communications device. The method is performed at the wireless communications device and comprises signaling a peripheral device worn by a user to enter a low-power transmission mode responsive to receiving user input at the user's wireless communications device, receiving security data from the peripheral device that was transmitted in the low-power transmission mode, and determining that the peripheral device is positioned within a predetermined distance of the user's wireless communications device responsive to receiving the security data.

In one embodiment, receiving security data transmitted by the peripheral device in the low-power transmission mode comprises receiving surface waves carrying the security data that have propagated across the user's skin.

In another embodiment, determining that the peripheral device is positioned within a predetermined distance of the wireless communications device comprises determining that the peripheral device is being worn by the user on a wrist of a hand that is holding the wireless communications device.

Additionally, in one embodiment, method may further comprise validating the received security data transmitted by the peripheral device in the low-power transmission mode. If the security data is valid, the method comprises transitioning the wireless communications device from a locked state to an unlocked state, and signaling the peripheral device to increase its transmit power. However, if the security data is not valid, the method further comprises signaling the peripheral device to retransmit the security data in the low-power mode, and maintaining the wireless communications device in the locked state.

In one embodiment, the method further comprises signaling the peripheral device to re-enter the low-power transmission mode responsive to detecting that the wireless communications device will transition from the unlocked state to the locked state.

In addition to the method, the present disclosure also provides, in at least one embodiment, a wireless communications device. In one embodiment, the wireless communications device comprises a communications interface circuit configured to communicate data with a peripheral device being worn by a user utilizing the user's own skin as a transport medium, a user input/output (I/O) interface circuit configured to receive user input, and a processor circuit. In one embodiment, the processor circuit is configured to signal the peripheral device to enter a low-power transmission mode responsive to receiving user input, receive security data from the peripheral device that was transmitted in the low-power transmission mode, and determine that the peripheral device is positioned within a predetermined distance of the wireless communications device responsive to receiving the security data.

In one embodiment, surface waves propagating across the user's skin carry the security data transmitted by the peripheral device in the low-power transmission mode.

In one embodiment, the processor circuit is further configured to determine that the peripheral device is being worn by the user on a wrist of a hand that is holding the wireless communications device responsive to receiving the security data.

In one embodiment, the processor circuit is further configured to validate the received security data transmitted by the peripheral device in the low-power transmission mode. If the security data is valid, the processor circuit is configured to transition the wireless communications device from a locked state to an unlocked state, and signal the peripheral device to increase its transmit power. However, if the security data is not valid, the processor circuit is further configured to signal the peripheral device to retransmit the security data in the low-power mode, and maintain the wireless communications device in the locked state.

In one embodiment, the processor circuit is further configured to signal the peripheral device to re-enter the low-power transmission mode responsive to detecting that the wireless communications device will transition from the unlocked state to the locked state.

Additionally, the present disclosure also provides a method for confirming that a peripheral device being worn by a user is positioned within a predetermined distance of the user's wireless communications device. In this embodiment, the method is performed at the peripheral device and comprises, responsive to receiving a first control signal from the wireless communications device, entering a low-power transmission mode, retrieving a predetermined security code from a memory circuit, and transmitting the security data to the wireless communications device in the low-power transmission mode using the user's own skin as a transmission medium.

In one embodiment, the method further comprises re-transmitting the security data to the wireless communications device in the low-power transmission mode using the user's own skin as a transmission medium responsive to receiving a second control signal from the wireless communications device.

In one embodiment, the method further comprises exiting the low-power transmission mode and increasing transmit power responsive to receiving a third control signal from the wireless communications device.

In one embodiment, the method further comprises re-entering the low-power transmission mode responsive to determining that the wireless communications device is no longer within a predetermined range of communications.

The present disclosure further provides a peripheral device worn by a user. In one embodiment, the peripheral device comprises a communications interface circuit configured to communicate signals and data with a wireless communications device using the user's own skin as a transmission medium, a memory circuit configured to store security data utilized by the wireless communications device to perform a predefined security function, and a processor circuit. In this embodiment, the processor circuit is configured to receive a first control signal from the wireless communications device via the communications interface circuit. In response to receiving the first control signal, the processor circuit is also configured to enter a low-power transmission mode, retrieve a predetermined security code from the memory circuit, and transmit the security data to the wireless communications device in the low-power transmission mode via the communications interface circuit.

In one embodiment, the processor is further configured to re-transmit the security data to the wireless communications device in the low-power transmission mode using the user's own skin as a transmission medium responsive to receiving a second control signal from the wireless communications device.

In one embodiment, the processor is further configured to exit the low-power transmission mode and increase its transmit power responsive to receiving a third control signal from the wireless communications device.

In one embodiment, the processor is further configured to re-enter the low-power transmission mode responsive to determining that the wireless communications device is no longer within a predetermined range of communications.

Of course, those skilled in the art will appreciate that the present invention is not limited to the above contexts or examples, and will recognize additional features and advantages upon reading the following detailed description and upon viewing the accompanying drawings

DETAILED DESCRIPTION

Turning now to the drawings, embodiments of the present disclosure provide methods and corresponding devices for confirming whether a peripheral device worn by a user is sufficiently close to (i.e., within a predetermined distance of) the user's wireless communication device. So confirmed, the user's wireless communication device may confidently utilize data and information transmitted by the peripheral device to perform a predetermined security function, such as transitioning from a locked state to an unlocked state.

Figure 1:
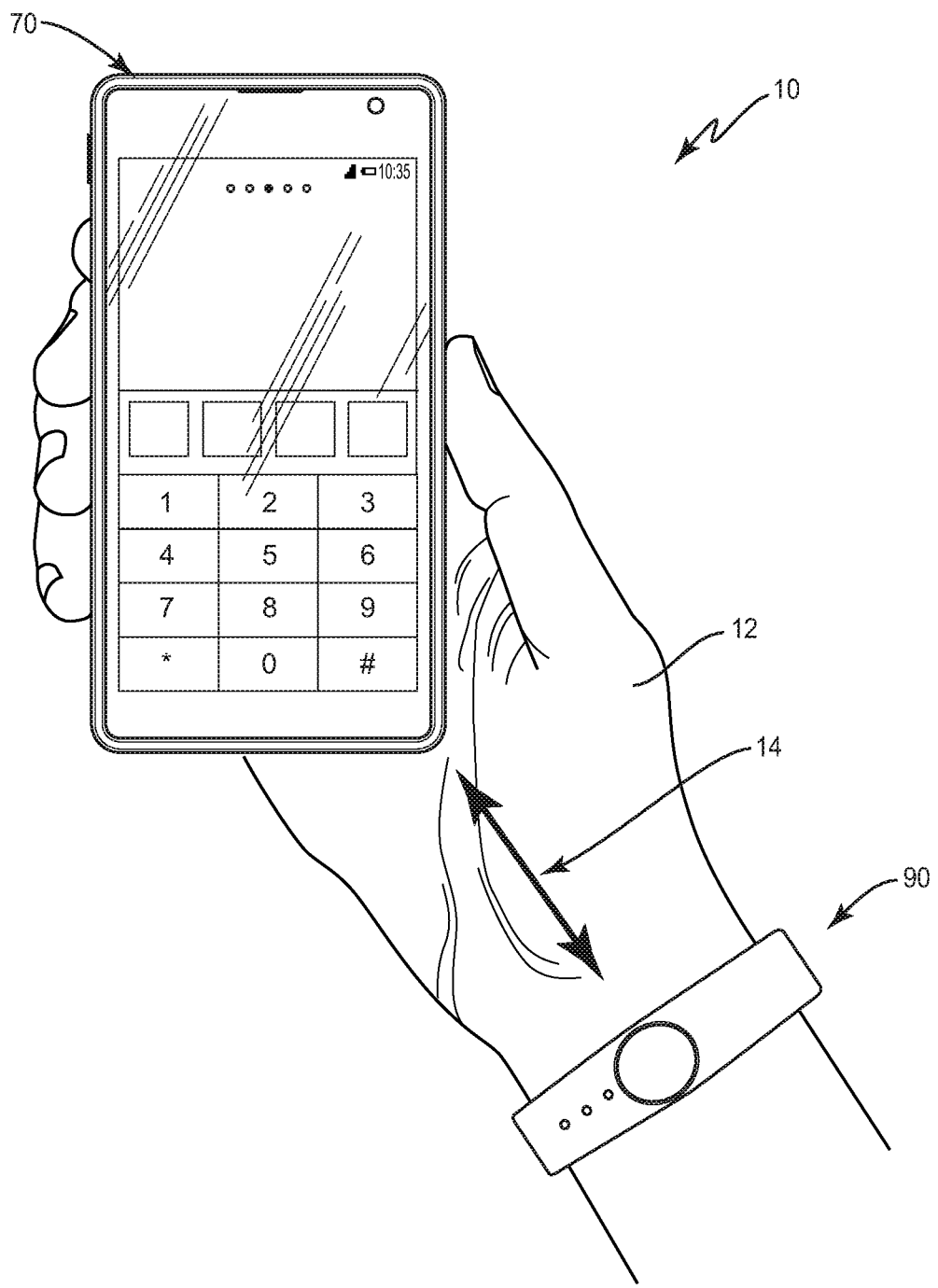
FIG. 1 is a perspective view illustrating a system and its components according to one embodiment of the present disclosure.

FIG. 1 is a perspective view of a system 10 configured according to one embodiment of the present disclosure. System 10 comprises a wireless communication device, illustrated here as a smartphone 70, and a peripheral device, which in this embodiment is a "wristlet" 90 that is worn by the user on a wrist. Generally, both the smartphone 70 and the wristlet 90 communicate with each other via a bi-directional communications link 14 that, as described later in more detail, employs the user's own body 12 as a transmission medium.

As is conventional, smartphones usually comprise some kind of screen lock functionality. With this function, a smartphone transitions to a locked state upon being idle for a predetermined period or in response to receiving predetermined user input (e.g., the user depresses a power button). To unlock the phone, the user must first actuate a user control on the smartphone, such as by depressing a power button or "wake" button, for example, to wake the smartphone. Once awake, the smartphone presents the user with a manual passcode entry screen. The user then manually enters a passcode, such as a predefined PIN, into the passcode entry screen. If the passcode entered by the user is valid, the smartphone transitions from the locked state to the unlocked state. If not, the smartphone remains in the locked state.

The small keypad displayed on smartphone can make such conventional manual entry of the passcode bothersome. Therefore, the smartphone 70 seen in FIG. 1 is also configured to bypass the manual entry passcode screen, and instead, receive the passcode from the wristlet 90. More particularly, the wristlet 90 stores the passcode in memory.

Upon receiving a request from smartphone 70, the wristlet 90 retrieves and sends the passcode to the smartphone 70. If valid, the smartphone 70 will bypass the manual passcode entry screen and automatically transition from the locked state to the unlocked state. Otherwise, smartphone 70 remains in the locked state.

Often times, the wristlet 90 must be very close to the smartphone 70 to automatically bypass the passcode lock screen. This is to ensure that the device (i.e., the wristlet 90) being used to unlock the smartphone 70 does indeed belong to the user and not to some malicious third party that is nearby. However, known methods for determining whether the two devices are sufficiently close together are unreliable. Therefore, as seen in FIG. 1, embodiments of the present disclosure allow for confirming that the two devices 70, 90 are within a predetermined distance of each other so that the smartphone 70 can be certain that the user's wristlet 90 is being used to unlock the phone instead of an unauthorized third party device.

Particularly, smartphone 70 and wristlet 90 each communicate data and information with each other over a bi-directional communications link 14 (i.e., an air interface) at very low-energy. In one embodiment, for example, the smartphone 70 and wristlet 90 communicate according to the BLUETOOTH LE (i.e., BLUETOOTH Low Energy) protocol. As known in the art, BLUETOOTH LE, also referred to as BLE, is a wireless personal area network technology operating in the 2.4 GHz range that facilitates the transmission of data at a considerably reduced power consumption while retaining a similar range of communication (about 50 meters) and a comparable throughput rate (about 1 Mbit). The BLUETOOTH LE protocol is well-known to those of ordinary skill in the art, and thus, is not discussed in detail here.

In accordance with the embodiments of the present disclosure, smartphone 70 selectively controls wristlet 90 to enter a low-power transmission mode. In this mode, wristlet 90 uses the user's body 12 as a transmission medium to transmit data such as the passcode, for example, to the smartphone 70 via the bi-directional communication link 14. More specifically, because the wristlet 90 is controlled to enter the low-power transmission mode, the transmissions from the wristlet 90 are embodied as surface waves that travel on top of the user's skin. Additionally, because of the reduced transmit power output, the range over which the data is transmitted is reduced. Given such purposeful constraints on the transmit output power of the wristlet 90, the smartphone 70 can be assured that whatever data it receives from the wristlet 90, such as the passcode, for example, is indeed transmitted by the wristlet 90 and not some third party malicious device that is located nearby.

Those of ordinary skill in the art will appreciate that the wristlet 90 may be controlled to transmit data and information at any power needed or desired. In one embodiment, however, the wristlet 90 is controlled to transmit data and information at about −30 dBm. At such a low transmit power, the communication range of the wristlet 90 is limited to about 1.6 meters. Thus, any devices within that 1.6 meter range may communicate with the wristlet 90, and in the case of smartphone 70, the transmitted waves reaching the smartphone 70 are surface waves traveling over the user's own body 12. Further, neither device 70, 90 require a special antenna optimized to transmit or receive such surface waves. Rather, each device may utilize its normal antenna. However, in some embodiments, the antennas for one or both of the devices 70, 90 may be optimized for communicating surface waves thereby increasing the reliability of the transmissions from the wristlet 90.

Figure 2:
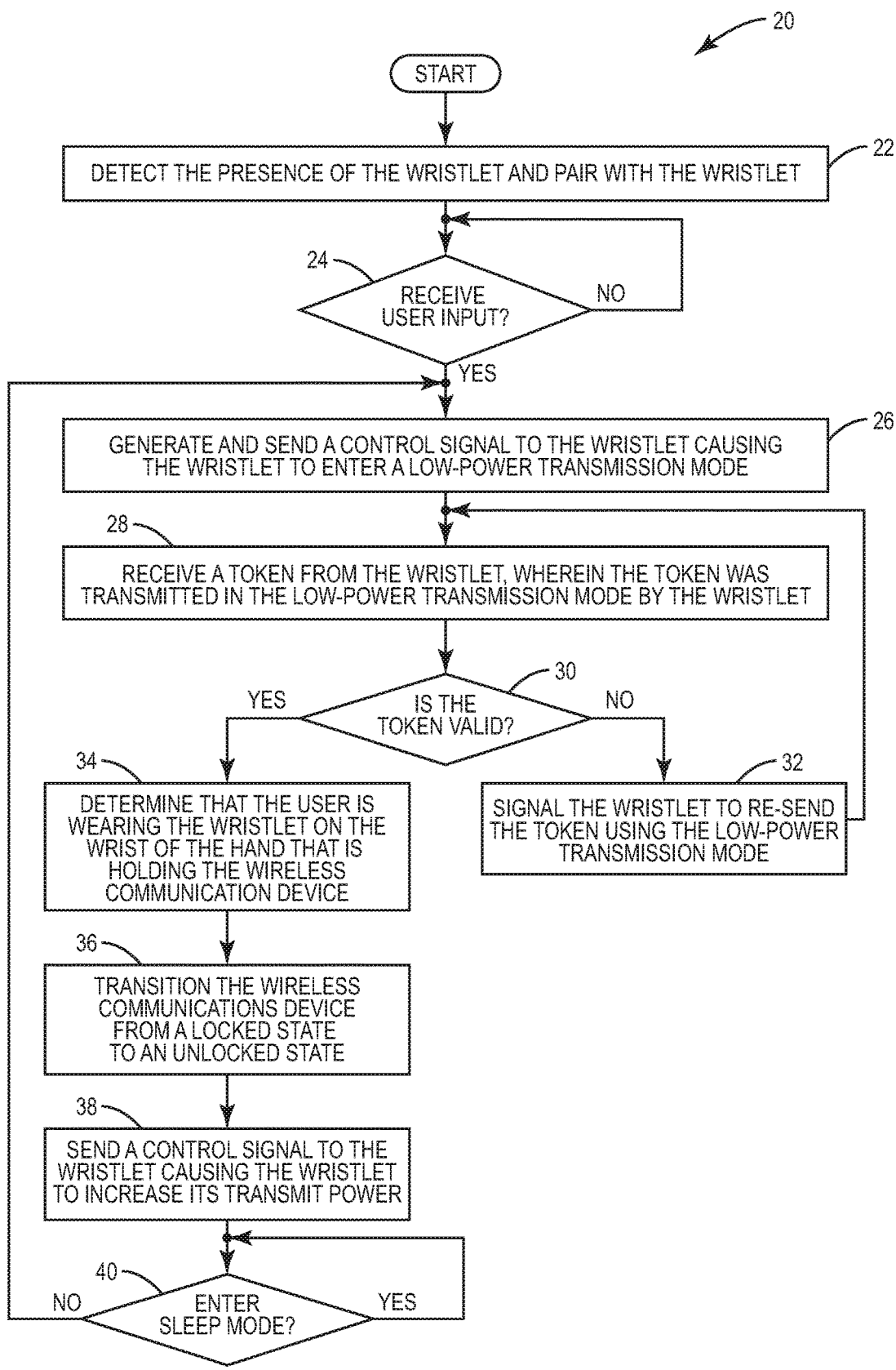
FIG. 2 is a flow diagram illustrating a method, performed at a wireless communications device, for confirming that a peripheral device worn by a user is positioned within a predetermined distance of the wireless communications device.

FIG. 2 is a flow diagram illustrating a method 20, performed at smartphone 70, for confirming the wristlet 90 is positioned within a predetermined physical distance of smartphone 70. As seen in FIG. 2, method 20 begins with the smartphone 70 and the wristlet 90 detecting each other's presence (box 22). Such discovery methods are well-known in the art, and thus, are not detailed here. Once discovered, one or both of the devices 70, 90 may establish the bi-directional communication link 14 between them such that they may communicate data and information according to the present disclosure. As stated above, each device 70, 90 comprises a transceiver that communicates in the 2.4 GHz range with other transceivers using the BLUETOOTH LE protocol.

Once the communications link 14 is established, smartphone 70 enters the locked state. In this state, the user cannot access the main menu or main screen of smartphone 70, thereby effectively locking the features of smartphone 70 from use by the user. To unlock the smartphone 70, the user must first provide an input into the smartphone 70 to "wake" or transition the smartphone 70 from the idle or "sleep" mode to an active mode. So long as smartphone 70 does not receive user input (box 24), smartphone 70 remains idle. However, upon receiving user input, smartphone generates and sends a control signal to the wristlet 90 that, upon receipt by wristlet 90, causes wristlet 90 to configure its transmitter in a low-power transmission mode (box 26). The control signal generated and sent by smartphone 70 may comprise any signal needed or desired; but in one embodiment, the control signal comprises a request message that carries an identifier uniquely identifying smartphone 70. Additionally, the request message may include a predetermined code or other form of data that the wristlet 90 will interpret as a request for a passcode stored at the wristlet 90.

As described in more detail later, the wristlet 90 returns a response message to smartphone 70 that includes a token (box 28). The received token may comprise, for example, the passcode stored at the wristlet 90 along with an identifier of the wristlet 90 or other information as needed or desired; however, in accordance with the present embodiment, the received token was transmitted by the wristlet 90 in the low-power transmission mode, as commanded by smartphone 70. As stated above, such low-power transmissions reduce the amount of reflected RF waves that are received at smartphone 70, and increase the chance that the RF waves received by smartphone 70 are surface waves that propagate across the skin of the user's body 12.

The smartphone 70 then attempts to validate the token (box 30). For example, smartphone 70 may compare the received token, or part of the received token, to data stored in its own internal memory. If the comparison yields a "no-match" condition, smartphone 70 may signal the wristlet 90 to re-send the token using the low-power transmission mode (box 32), and then, try once again to validate the received token (boxes 28, 30). Such attempts may continue for a predetermined number of times until successful. However, if after a predetermined number of attempts the smartphone 70 cannot validate the code, method 20 could stop. Although not explicitly shown, the user could then manually enter the passcode to unlock smartphone 70.

If, however, smartphone successfully validates the received token (box 30), the smartphone 70 can determine that wristlet 90 is within a predetermined physical distance of smartphone 70. In one embodiment, for example, the successful receipt and validation of the token allows smartphone 70 to determine that the user is wearing the wristlet 90 on the wrist of the same hand that is currently holding the smartphone 70 (box 34). This is because the low transmit power of wristlet 90 increases the surface wave propagation of the response message over the user's skin. Additionally, responsive to the validation, smartphone 70 will transition from the locked state to the unlocked state thereby permitting the user to access the features and functions of smartphone 70 (box 36). Once unlocked, smartphone 70 may generate and send a second control signal or message to control the wristlet 90 to exit the low-power transmission mode, and instead, increase its transmit power (box 38). This will allow the wristlet 90 and the smartphone 70 to continue communicating, as needed or desired, using normal transmit power levels thereby increasing the range of communications to a more typical 10 meters.

As is known in the art, smartphone 70 will, at times, automatically re-enter a sleep mode due to the inactivity of the user for a predetermined period of time. Other factors that may cause smartphone 70 to enter the sleep mode, however, is the detection of an explicit user input action (e.g., the user depresses the power button on smartphone 70). Entering the sleep mode automatically will, as is known in the art, facilitate saving the battery resources of the smartphone 70. With conventional devices, smartphones would simply enter the sleep mode after the user-configurable time has elapsed. However, with a smartphone 70 configured to one embodiment of the present disclosure, the smartphone 70 is configured to first send another control signal to the wristlet 90 to once again place the wristlet 90 in the low-power transmission mode (box 26). If the wristlet 90 moves out of range of smartphone 70, wristlet 90 will once again transmit the token to smartphone 70 upon returning within communications range.

Figure 3:
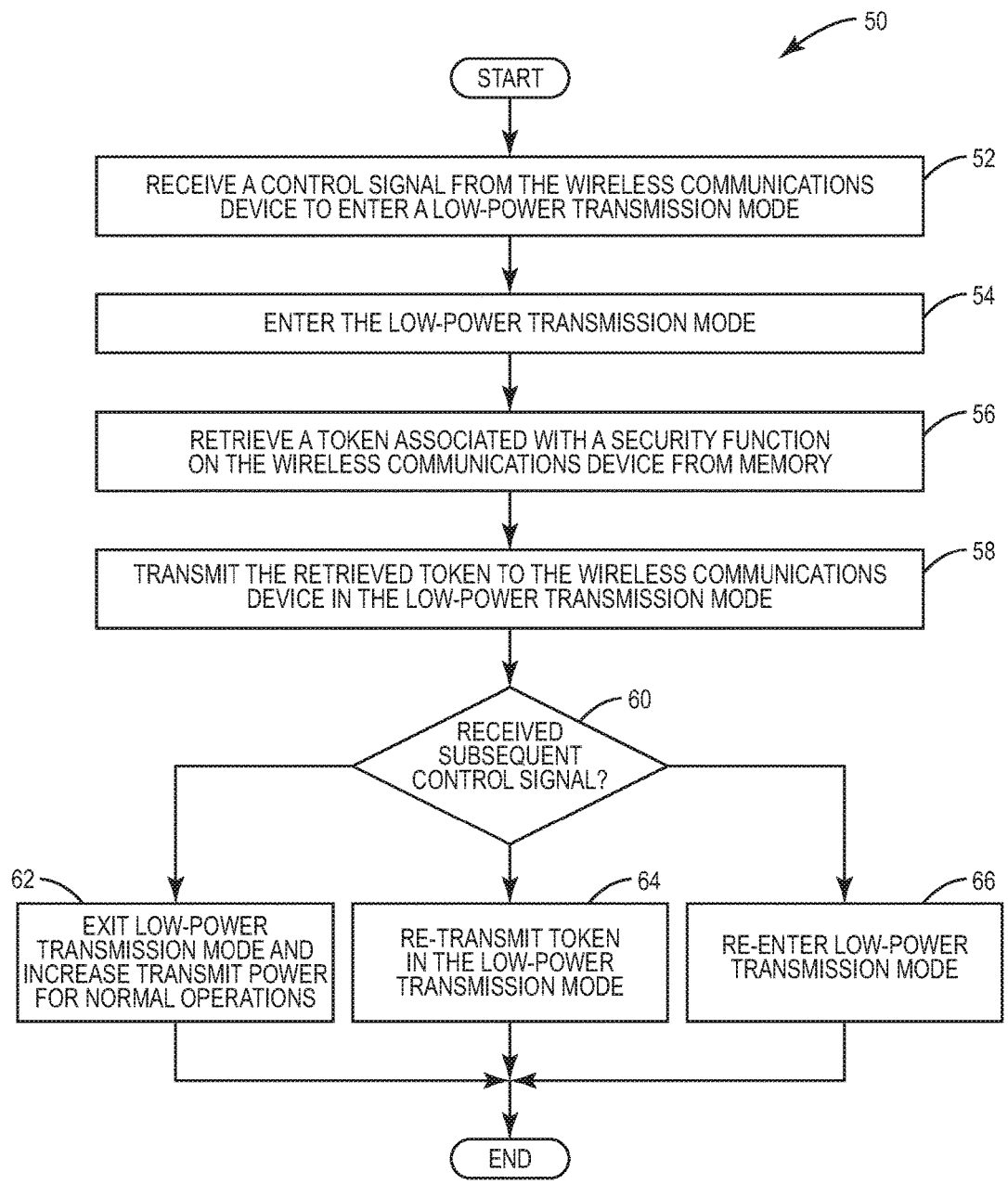
FIG. 3 is a flow diagram illustrating a method, performed at a peripheral device worn by a user, for confirming that the peripheral device is positioned within a predetermined distance of the wireless communications device.

FIG. 3 is a flow diagram illustrating a method 50, performed at wristlet 90, for confirming the wristlet 90 is positioned within a predetermined physical distance of smartphone 70. As seen in FIG. 3, the wristlet 90 first receives a command signal, which may be a request message, for example, from smartphone 70 (box 52). Upon receipt of the control signal from smartphone 70, wristlet 90 controls its transmitter (seen later in FIG. 4) to enter a low-power transmission mode (box 54), and then retrieves a token from memory (box 56). The token may comprise, for example, a passcode known to the smartphone 70 that is utilized for a security function performed at the smartphone 70, such as transitioning the smartphone 70 from a locked state to an unlocked state. Additionally, in some embodiments, the token may include an identifier of the wristlet 70 to identify the wristlet 90 to the smartphone 70. Once retrieved from the memory, wristlet 90 transmits the token to the smartphone 70 in the low-power transmission mode as commanded by the smartphone 70 (box 58).

Thereafter, the wristlet may receive subsequent control signals from the smartphone 70 to control how the wristlet 90 functions (box 60). For example, a first subsequent control signal received from smartphone 70 may control wristlet 90 to exit the low-power mode and increase its transmit power (box 62). As stated previously, this would facilitate additional communications and functions of smartphone 70 and wristlet 90. Alternatively, or in addition, the wristlet 90 may receive a second or third subsequent control signal from smartphone 70. Upon receiving the second subsequent control signal, wristlet 90 may re-transmit the token in the low-power transmission mode (box 64). Such a signal may be received, for example, if the token already sent by the wristlet 90 was not properly received at smartphone 70. Receiving the third subsequent control signal at wristlet 90 may cause the wristlet 90 to re-enter the low-power transmission mode (box 66). Such commands may be sent by smartphone 70, for example, if it detects that the wristlet 90 has moved out of communications range with the smartphone 70, and cause the wristlet to once again retrieve and send the token to the smartphone 70 in the low-power transmission mode.

Figure 4:
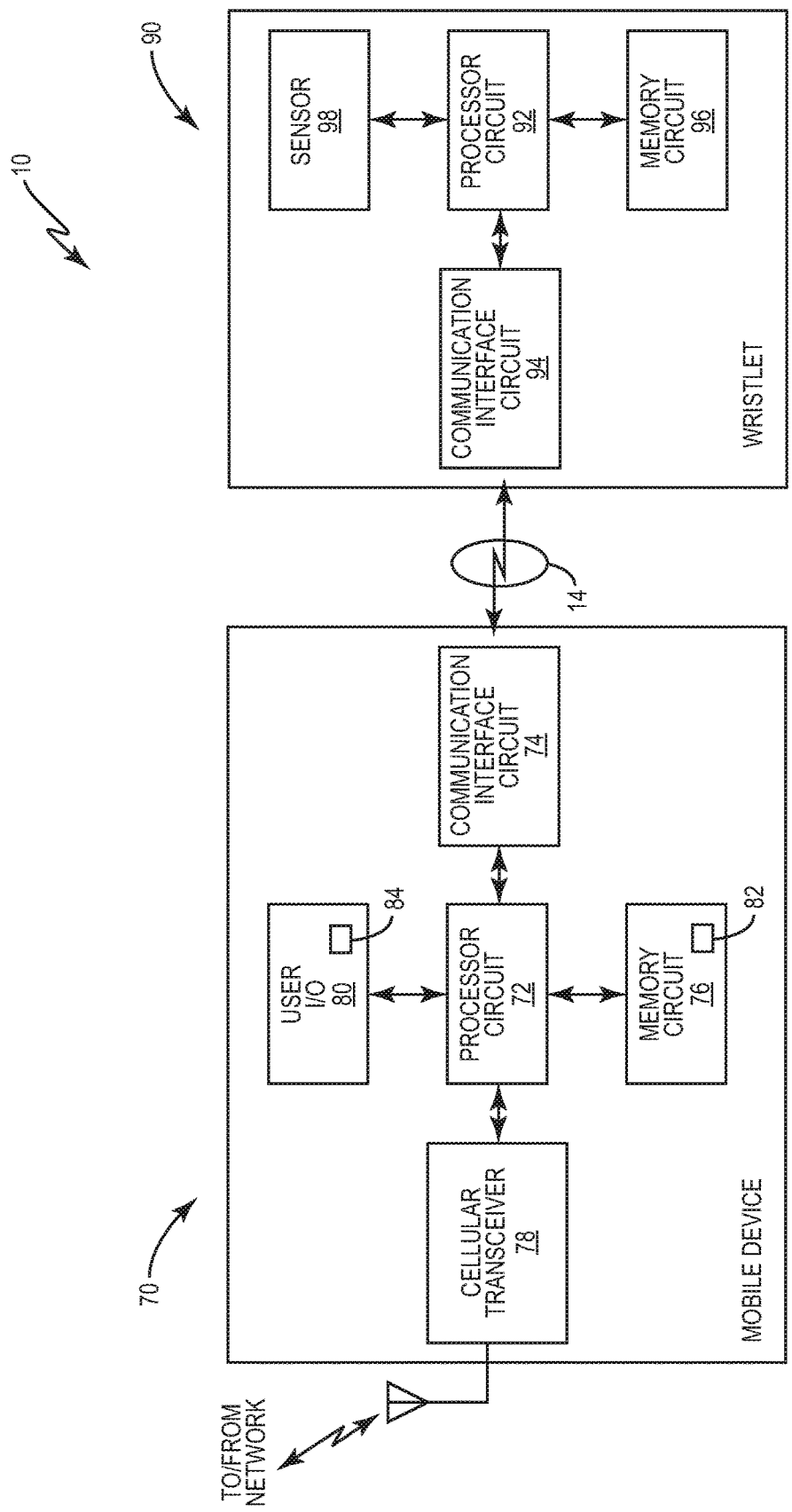
FIG. 4 is a block diagram illustrating some components of a wireless communications device and a peripheral device configured according to one embodiment of the present disclosure.

FIG. 4 is a block diagram illustrating some components of the two devices that comprise system 10—i.e., smartphone 70 and wristlet 90—configured according to one embodiment of the present disclosure. As seen in FIG. 4, smartphone 70 comprises a processor circuit 72, a BLUETOOTH LE capable communication interface circuit 74, a memory circuit 76, a cellular transceiver 78, and a User Input/Output (I/O) interface 80.

Processor circuit 72 comprises an electronics circuit configured to generally control the operation of the smartphone 70 according to programs and data stored in memory 76. Such programs and data include, but are not limited to, a control program 82 comprising logic and instructions that, when executed by the processor circuit 72, detect the user's actuation of a user control on the user I/O interface 80, and in response, generates and sends a control signal to wristlet 90 causing wristlet 90 to enter a low-power transmission mode. Processing circuit 72 may be implemented, for example, in a single microprocessor, or in multiple microprocessors. Suitable microprocessors may include general purpose and special purpose microprocessors, as well as digital signal processors.

The BLUETOOTH LE capable communication interface circuit 74 comprises an interface circuit configured to communicate signals and data with a corresponding BLUETOOTH LE capable communication interface circuit 94 at the wristlet 90. As stated above, the communication interface circuit 74 may be configured to transmit and receive signals and data using the user's own body as the transmission medium (i.e., as surface waves traveling over the user's skin). Generally, the physical distance between the two communication interface circuits 74, 94 is relatively short. For example, as described above, the user will wear the wristlet 90 on the wrist of the same hand that will hold smartphone 70. Therefore, the communication interface circuits 74, 94 would communicate over a distance that extends between that hand and wrist. Such short distance transmissions are necessary due to the very low power output of the communication interface circuit 96, and thus, help ensure the security of the transmissions carrying the passcode.

Memory circuit 76 is a computer readable medium representing the entire hierarchy of memory in, or accessible to, smartphone 70. Memory 76 may comprise both random access memory (RAM) and read-only memory (ROM), and may be implemented, for example, as one or more discrete devices, stacked devices, or removable devices, such as a flash drive or memory stick. In one embodiment, the memory 76 may be integrated with processor circuit 72. In other embodiments, however, memory 76 is a separate circuit. As previously stated, memory circuit 76 may store control programs 82 responsible for controlling the operation of smartphone 70, as well as that of wristlet 90, according to embodiments of the present disclosure.

The cellular transceiver 78 may comprise any cellular transceiver for transmitting and receiving data, such as downloaded video and/or audio content, for example, to and from a base station in a wireless communications network. Thus, in one embodiment, the cellular transceiver 78 comprises a fully functional cellular radio transceiver that operates according to any known standard. Such standards include, but are not limited to, the Global System for Mobile Communications (GSM), TIA/EIA-136, cdmaOne, cdma2000, UMTS, WiFi, and Wideband CDMA.

The User I/O interface (UI) 80 provides a user with the necessary components to interact with the smartphone 70. Typically, the UI 80 includes a display, a speaker, a microphone, and a variety of user controls, which may include, but is not limited to, a keypad or buttons, such as power button 84, or other user control that, when actuated by a user, wakes smartphone 70 form an idle state or sleep mode. In one embodiment, the processing circuit 72 detects when the user actuates such a control, and in response, controls the wristlet 90 to enter a low-power transmission mode, as previously described.

Wristlet 90 also comprises a variety of components including, but not limited to, a processor circuit 92, a BLUETOOTH LE capable communication interface circuit 94, a memory circuit 96, and a sensor 98. The processor circuit 92 may also comprise an electronics circuit configured to generally control the operation of the wristlet 90 according to programs and data stored in memory 96. Such programs and data include, but are not limited to, logic and instructions that, when executed by the processor circuit 92, control the establishment of the bi-directional communication link 14. The programs and data may also configure the processing circuit 92 to retrieve and send a unique identifier (e.g., a hardware identifier of wristlet 90) to the smartphone 70 upon receiving a request for such information, as well as to store a passcode generated by the smartphone 70 in memory 96. Additionally, the programs and data may also configure the processor circuit 72 to receive signals from sensor 98, and activate the communication interface circuit 94 to communicate with communication interface circuit 74 via the bi-directional communication link 14. As above, the processing circuit 92 may be implemented, for example, in a single microprocessor, or in multiple microprocessors. Suitable microprocessors may include general purpose and special purpose microprocessors, as well as digital signal processors.

The BLUETOOTH LE capable communication interface circuit 94 also comprises a transmitter and a receiver, and is controlled according to embodiments of the present disclosure to communicate with the corresponding BLUETOOTH LE capable communication interface circuit 74 at smartphone 70. In one embodiment, BLUETOOTH LE capable communication interface circuit 94 receives a control signal from the BLUETOOTH LE capable communication interface circuit 74, and then enters a low-power transmission mode in response to receiving the control signal. Additionally, the BLUETOOTH LE capable communication interface circuit 94 sends a token, which may comprise a passcode, for example, back to the BLUETOOTH LE capable communication interface circuit 74 to allow the smartphone 70 to automatically unlock the smartphone 70 for the user. As stated previously, the data and signals communicated between by BLUETOOTH LE capable communication interface circuit 94 uses the user's own body as a transmission medium, and in one embodiment, utilizes a low enough transmit power so as to propagate RF waves carrying the token as surface waves across the user's skin.

Memory circuit 96 is a computer readable medium representing the entire hierarchy of memory in, or accessible to, wristlet 90. Memory 96 may comprise both random access memory (RAM) and read-only memory (ROM), and may be implemented, for example, as one or more discrete devices, stacked devices, or removable devices, such as a flash drive or memory stick. In one embodiment, the memory 96 may be integrated with processor circuit 92. As previously stated, memory circuit 96 may store the logic and instructions responsible for controlling the operation of wristlet 90, as well as for storing passcodes generated by the smartphone 70.

The sensor 98 can be any sensor known in the art configured to detect when the wristlet is secured to the user's wrist. In one embodiment, such a sensor may comprise a "tremor sensor" configured to detect the tremors present in human muscles. As stated previously, such sensors are able to sense tremors within the 8-12 Hz range. However, other sensors are also possible, such as those that are configured to detect body temperature, blood flow, and pulse, for example. In one embodiment, signals coming from sensor 98 may be received at the processor circuit 92, and are used as a trigger to activate the communication interface circuit 94 and establish the bi-directional communication link 14.

The present invention may, of course, be carried out in other ways than those specifically set forth herein without departing from essential characteristics of the invention. For example, those of ordinary skill in the art will readily appreciate that the illustration of the illustrated devices as a smartphone and a wristlet is merely illustrative and not limiting. Indeed, the wireless communication device need not be a smartphone, and can comprise any device capable of being held in or touched by the user's hand. Laptop or notebook computers, for example, are just some examples of suitable devices. Similarly, the peripheral device may comprise any item that is capable of being worn by the user such that it is sufficiently close in distance to the wireless communication device. Examples of some suitable peripheral devices would include, but are not limited to bracelets and rings.

Therefore, the present embodiments are to be considered in all respects as illustrative and not restrictive, and all changes coming within the meaning and equivalency range of the appended claims are intended to be embraced therein.

What is claimed is:

1. A method for confirming that a peripheral device is positioned within a predetermined distance of a wireless communications device, the method performed at the wireless communications device, the method comprising:
   transmitting a control signal to a peripheral device worn by a user responsive to receiving user input at the user's wireless communications device, wherein the control signal controls the peripheral device to enter a low-power transmission mode;
   receiving security data from the peripheral device that was transmitted in the low-power transmission mode; and
   determining that the peripheral device is positioned within a predetermined distance of the user's wireless communications device responsive to receiving the security data.

2. The method of claim 1 wherein receiving security data transmitted by the peripheral device in the low-power transmission mode comprises receiving surface waves carrying the security data that have propagated across the user's skin.

3. The method of claim 1 wherein determining that the peripheral device is positioned within a predetermined distance of the wireless communications device comprises determining that the peripheral device is being worn by the user on a wrist of a hand that is holding the wireless communications device.

4. The method of claim 1 further comprising:
  validating the received security data transmitted by the peripheral device in the low-power transmission mode; and
  responsive to the security data being valid:
    transitioning the wireless communications device from a locked state to an unlocked state; and
    signaling the peripheral device to increase its transmit power.

5. The method of claim 4 wherein responsive to the security data being invalid, the method further comprises:
  signaling the peripheral device to retransmit the security data in the low-power mode; and
  maintaining the wireless communications device in the locked state.

6. The method of claim 4 further comprising signaling the peripheral device to re-enter the low-power transmission mode responsive to detecting that the wireless communications device will transition from the unlocked state to the locked state.

7. A wireless communications device comprising:
  a communications interface circuit configured to communicate data with a peripheral device being worn by a user utilizing the user's own skin as a transport medium;
  a user input/output (I/O) interface circuit configured to receive user input; and
  a processor circuit configured to:
    transmit a control signal to the peripheral device responsive to receiving user input at the user I/O interface circuit, wherein the control signal controls the peripheral device to enter a low-power transmission mode;
    receive security data from the peripheral device that was transmitted in the low-power transmission mode; and
    determine that the peripheral device is positioned within a predetermined distance of the wireless communications device responsive to receiving the security data.

8. The wireless communications device of claim 7 wherein surface waves propagating across the user's skin carry the security data transmitted by the peripheral device in the low-power transmission mode.

9. The wireless communications device of claim 7 wherein the processor circuit is further configured to determine that the peripheral device is being worn by the user on a wrist of a hand that is holding the wireless communications device responsive to receiving the security data.

10. The wireless communications device of claim 7 wherein the processor circuit is further configured to:
  validate the received security data transmitted by the peripheral device in the low-power transmission mode; and
  responsive to the security data being valid:
    transition the wireless communications device from a locked state to an unlocked state; and
    signal the peripheral device to increase its transmit power.

11. The wireless communications device of claim 10 wherein responsive to the security data being invalid, the processor circuit is further configured to:
  signal the peripheral device to retransmit the security data in the low-power mode; and
  maintain the wireless communications device in the locked state.

12. The wireless communications device of claim 10 the processor circuit is further configured to signal the peripheral device to re-enter the low-power transmission mode responsive to detecting that the wireless communications device will transition from the unlocked state to the locked state.

13. A method for confirming that a peripheral device being worn by a user is positioned within a predetermined distance of the user's wireless communications device, the method performed at the peripheral device, the method comprising:
  responsive to receiving a first control signal from the wireless communications device:
    entering a low-power transmission mode;
    retrieving a predetermined security code from a memory circuit; and
    transmitting the security data to the wireless communications device in the low-power transmission mode using the user's own skin as a transmission medium.

14. The method of claim 13 further comprising re-transmitting the security data to the wireless communications device in the low-power transmission mode using the user's own skin as a transmission medium responsive to receiving a second control signal from the wireless communications device.

15. The method of claim 13 further comprising exiting the low-power transmission mode and increasing transmit power responsive to receiving a third control signal from the wireless communications device.

16. The method of claim 15 further comprising re-entering the low-power transmission mode responsive to determining that the wireless communications device is no longer within a predetermined range of communications.

17. A peripheral device worn by a user comprising:
  a communications interface circuit configured to communicate signals and data with a wireless communications device using the user's own skin as a transmission medium;
  a memory circuit configured to store security data utilized by the wireless communications device to perform a predefined security function; and
  a processor circuit configured to:
    receive a first control signal from the wireless communications device via the communications interface circuit; and
    responsive to receiving the first control signal:
      enter a low-power transmission mode;
      retrieve a predetermined security code from the memory circuit; and
      transmit the security data to the wireless communications device in the low-power transmission mode via the communications interface circuit.

18. The peripheral device of claim 17 wherein the processor is further configured to re-transmit the security data to the wireless communications device in the low-power transmission mode using the user's own skin as a transmission medium responsive to receiving a second control signal from the wireless communications device.

19. The peripheral device of claim 17 wherein the processor is further configured to exit the low-power transmission mode and increase its transmit power responsive to receiving a third control signal from the wireless communications device.

20. The peripheral device of claim 19 wherein the processor is further configured to re-enter the low-power transmission mode responsive to determining that the wireless communications device is no longer within a predetermined range of communications.

\* \* \* \* \*